United States Patent [19]
Toto

[11] Patent Number: 5,511,497
[45] Date of Patent: Apr. 30, 1996

[54] DIGGER FOR FACILITATING THE APPLICATION OF A SUPPLEMENT TO A MUSHROOM BED

[75] Inventor: Remo Toto, Avondale, Pa.

[73] Assignee: Remo's Mushroom Services, Inc., Avondale, Pa.

[21] Appl. No.: 185,368

[22] Filed: Jan. 24, 1994

[51] Int. Cl.$^6$ .................... A01G 1/04; B65B 1/30
[52] U.S. Cl. .................. 111/118; 111/122; 111/200; 47/1.1
[58] Field of Search .................. 111/118, 121, 111/122, 200; 47/1.102, 1.105, 1.103, 1.104, 1.107

[56] References Cited

U.S. PATENT DOCUMENTS

| | | | |
|---|---|---|---|
| 1,571,481 | 2/1926 | Kasmeier | 111/121 X |
| 2,072,331 | 3/1937 | Hanna | 111/118 |
| 2,173,771 | 9/1939 | Taylor | 111/122 X |
| 2,539,253 | 1/1951 | Jorgensen | 111/200 X |
| 2,545,059 | 3/1951 | Ward | 111/200 X |
| 2,690,145 | 9/1954 | Romain | 111/200 X |
| 2,723,493 | 11/1955 | Stoller | 47/1.105 |
| 3,560,190 | 2/1971 | Hughes et al. | 47/1.107 X |
| 3,704,752 | 12/1972 | Piacentino | 47/1.102 X |
| 3,961,938 | 6/1976 | Iizuka et al. | 47/1.107 X |
| 3,970,012 | 7/1976 | Jones, Sr. | 111/118 |
| 4,273,495 | 6/1981 | Pannell | 47/1.102 X |
| 4,421,543 | 12/1983 | Holtz | 47/1.107 X |
| 4,512,103 | 4/1985 | Coulthard et al. | 47/1.104 |
| 4,537,613 | 8/1985 | Pebeyre et al. | 47/1.104 X |
| 4,764,199 | 8/1988 | Pratt et al. | 47/1.107 X |
| 4,776,872 | 10/1988 | Mulleavy et al. | 47/1.107 X |
| 4,990,173 | 2/1991 | Katz et al. | 47/1.104 X |

FOREIGN PATENT DOCUMENTS

| | | | |
|---|---|---|---|
| 1039118 | 9/1978 | Canada | 111/121 |
| 1271016 | 7/1990 | Canada | 47/1.103 |

*Primary Examiner*—Dave W. Arola
*Assistant Examiner*—Christopher J. Novosad
*Attorney, Agent, or Firm*—Connolly & Hutz

[57] ABSTRACT

A digger for facilitating the application of a supplement to a mushroom bed includes a shroud having a top wall and side walls. A motor driven shaft is mounted to the side walls with the plurality of digging tines extending generally radially outwardly from the shaft. Supplement is conveyed from a compartment mounted to the shroud and toward the area of the mushroom bed where the tines are digging into the bed.

19 Claims, 6 Drawing Sheets

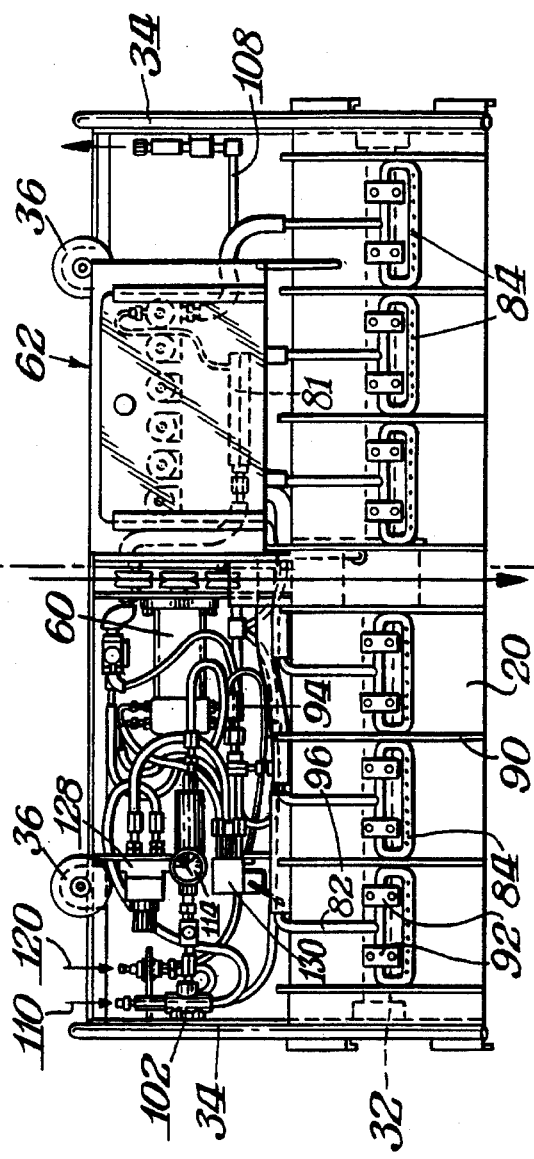
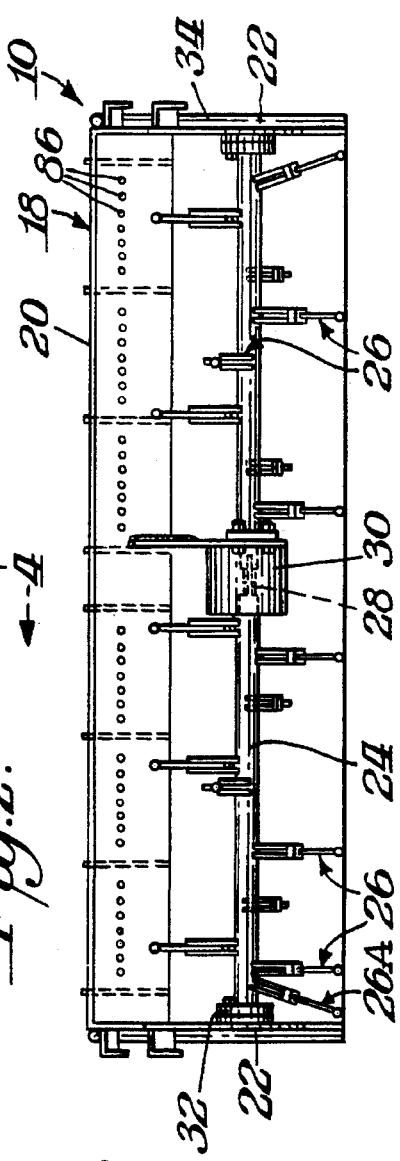
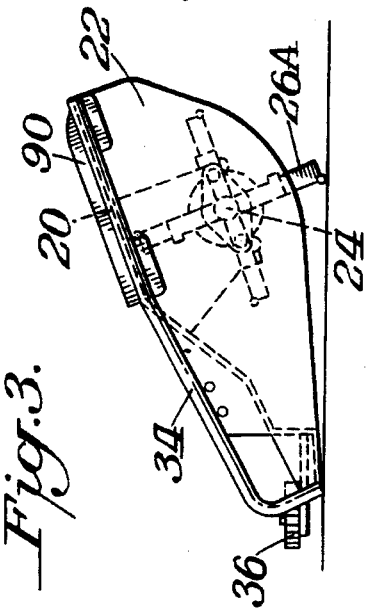

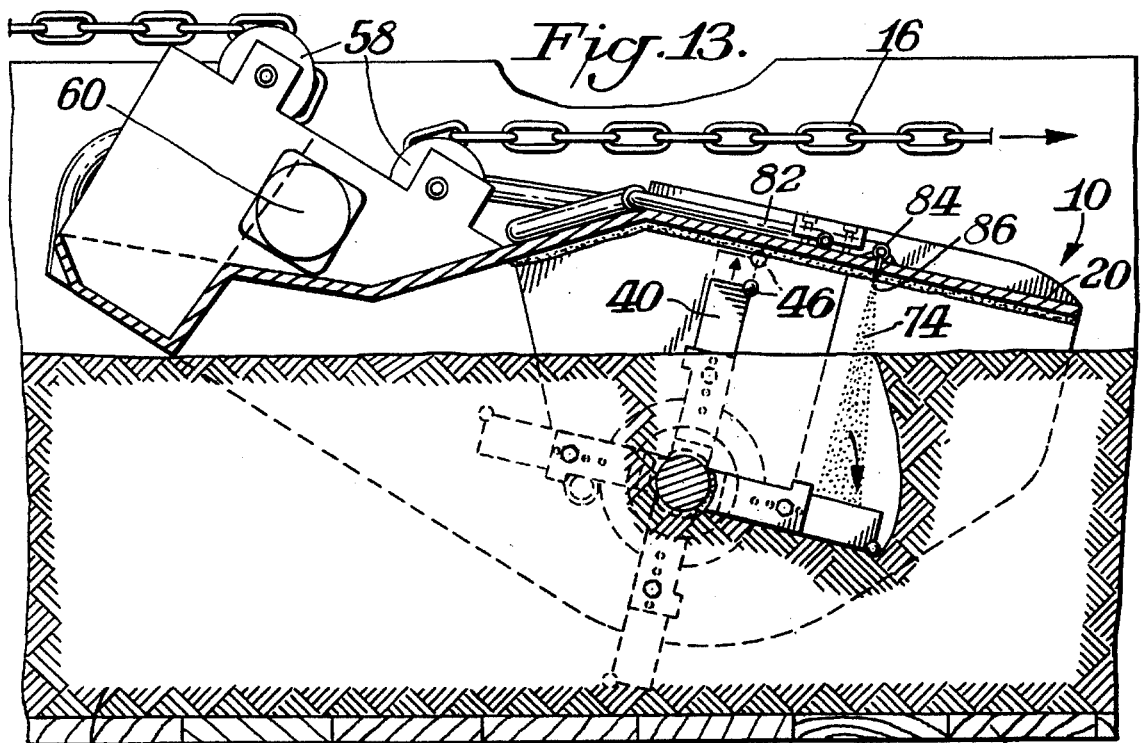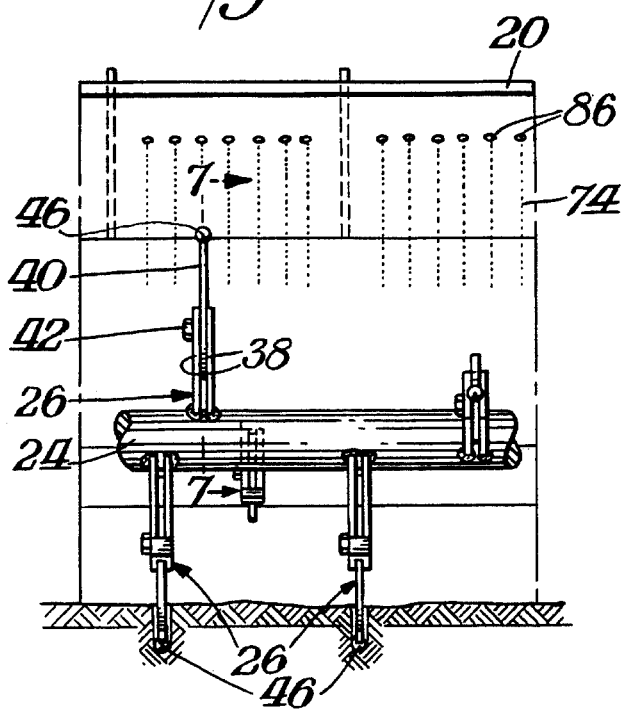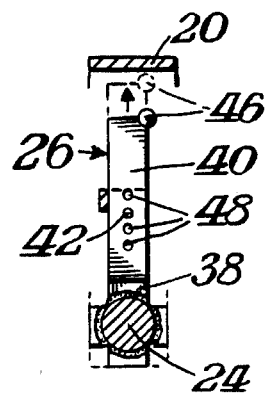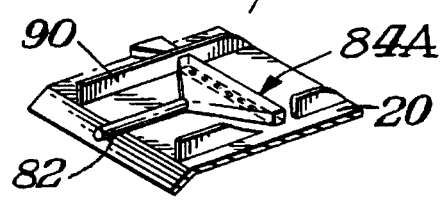

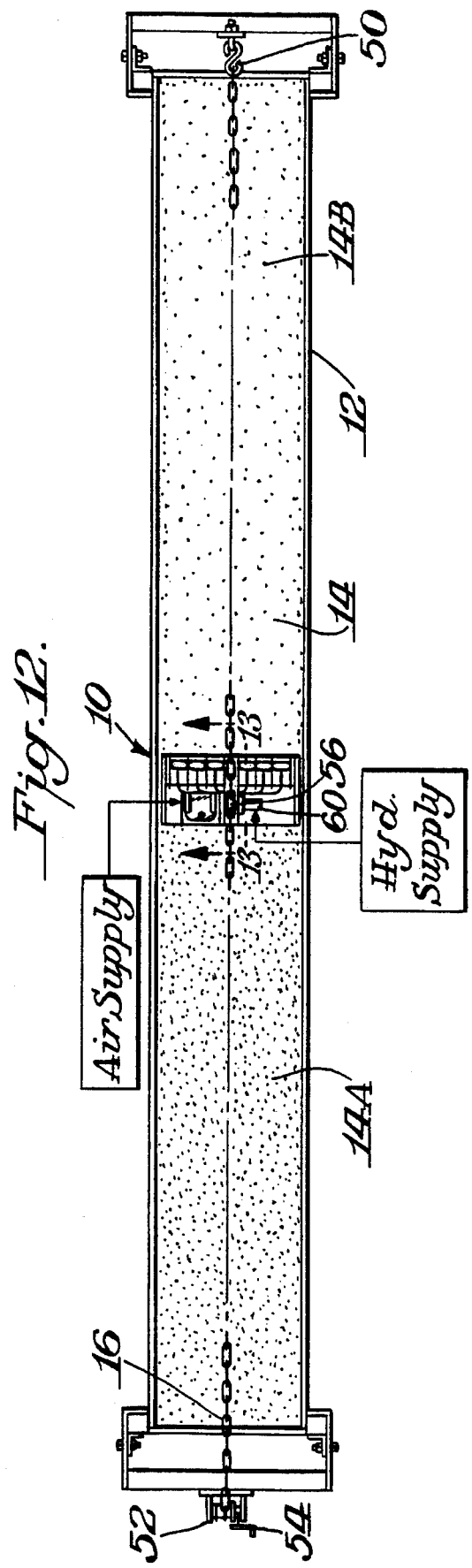

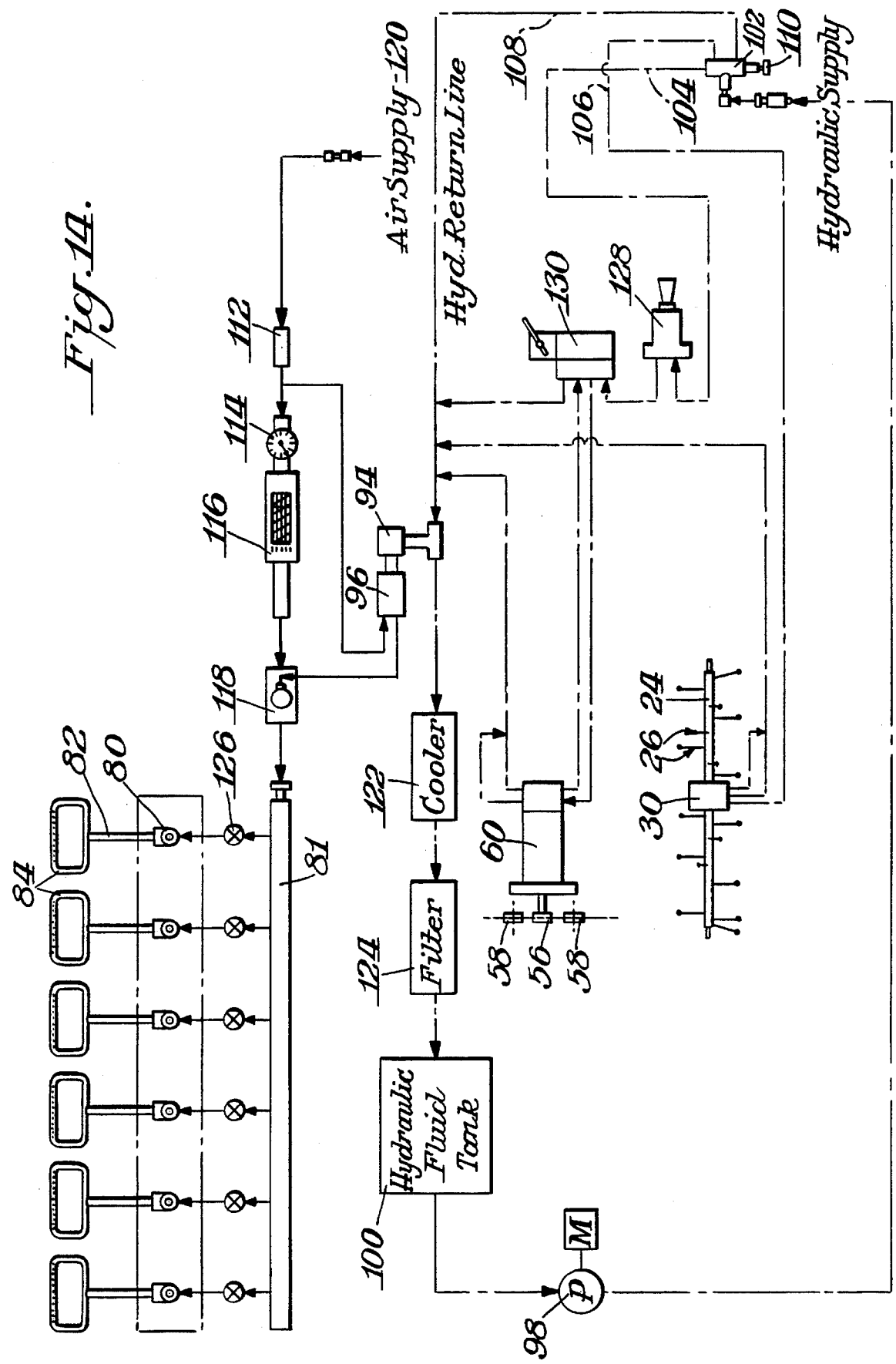

DIGGER FOR FACILITATING THE APPLICATION OF A SUPPLEMENT TO A MUSHROOM BED

BACKGROUND OF THE INVENTION

In the mushroom industry a mushroom bed having compost in caked form is used for growing the mushroom. During a stage in the mushroom growing a digger is conventionally used which includes tines mounted on a rotating shaft. The digger is moved from one end of the bed to another to work the compost so that it will be in a condition to receive a supplement. Generally, the supplement is in powder form and is manually applied to the worked bed. The fact that reliance must be had on manual labor to perform the supplement application has a number of drawbacks. This form of supplement application is costly because of the time required for the workers to apply the supplement. In addition, since unskilled workers are generally used for this task, the manner of applying the supplement can be inconsistent in that various areas require uniform application and certain areas require more application than adjacent areas. For example, the center of the bed would generally require a greater application. With conventional application techniques the desired manners of application might not be achieved. Additionally, when unskilled labor is used for applying the supplement waste occurs from, for example, spillage. The conventional manner of digging and then having manual application of the supplement is also disadvantageous in that it leads to high air conditioning costs in order to maintain the proper temperature.

SUMMARY OF THE INVENTION

An object of this invention is to provide a digger which includes means for automatically applying a supplement simultaneously with the digging action.

A further object of this invention is to provide such a digger which has versatility in the manner of supplement application.

A still further object of this invention is to provide such a digger which includes safety controls to avoid damage or waste of supplement under improper conditions.

In accordance with this invention the digger is in the form of a shroud having a top wall and depending side walls. A shaft is mounted to the side walls with tines extending generally radially from the shaft to dig into the mushroom bed. The shaft is motor driven. The shroud also includes a compartment for the supplement. Conveying means delivers the supplement from the compartment to the mushroom bed in the area where the tines are digging into the bed.

In a preferred practice of this invention the motor is center mounted on the shaft by forming the shaft in two shaft segments each of which is spliced to the motor.

The invention is preferably practiced by utilizing a flow of air through the bottom of the compartment to create a venturi action for drawing the powdered supplement into the air flow and delivery heads where the flow is distributed into individual streams, Each stream may be controlled for adjusting the amount of flow from a high level to no flow at all,

THE DRAWINGS

FIG. 1 is a top plan view of a digger in accordance with this invention;

FIG. 2 is a front elevational view of the digger shown in FIG. 1;

FIG. 3 is a side elevational view of the digger shown in FIGS. 1–2;

FIG. 6 is an enlarged fragmental front elevational view of a portion of the digger shown in FIGS. 1–5;

FIG. 7 is a cross-sectional view taken through FIG. 6 along the line 7—7;

FIG. 8 is a perspective view of an alternative form of delivery head in accordance with this invention;

FIG. 12 is a top plan view showing use of the digger of this invention on a mushroom bed;

FIG. 13 is a cross-sectional view taken along the line 13—13 of FIG. 12; and

FIG. 14 is a schematic view showing the hydraulic and air systems used with the digger of this invention.

DETAILED DESCRIPTION

Figure 4:
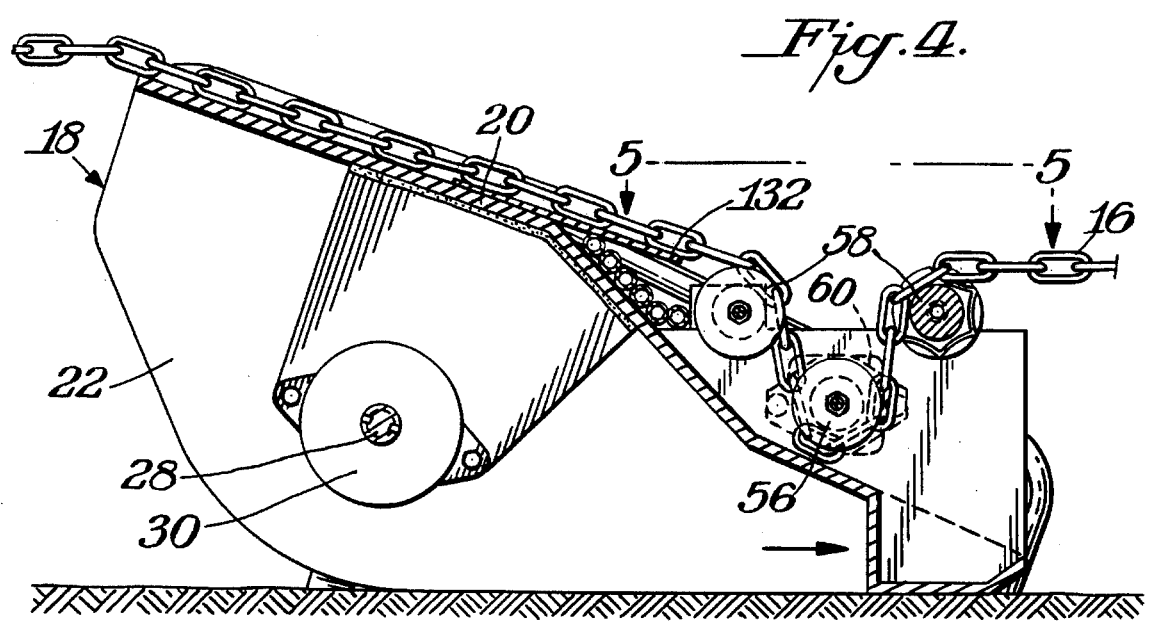
FIG. 4 is a cross-sectional view taken through FIG. 1 along the line 4—4.

FIG. 12 illustrates a digger 10 in accordance with this invention. As shown therein digger 10 is placed on a mushroom bed 12 which contains mushroom compost 14. A chain 16 is mounted longitudinally down the center line of bed 12 to act in cooperation with digger 10 for moving digger 10 from one end of the bed 12 to the other. As shown in FIG. 12 the movement is from the left hand end to the right hand end of bed 12. During this movement the compost is worked or conditioned by the digging action of digger 10 so that it can readily accept a supplement as later described. FIG. 12 thus illustrates compost 14A which has been worked by digger 10 and compost 14B which is still in solid or caked form.

Digger 10 may take any suitable construction including being generally structured in the manner known in the prior art. As illustrated in the various Figures digger 10 includes a shroud 18 having a top wall 20 and a pair of side walls 22. As best shown in FIG. 2 a shaft 24 is mounted to side walls 22,22. A plurality of tines 26 is mounted radially outwardly from shaft 24. The preferred arrangement is to have each tine offset 90° from its offset tine so that the tines in combination assume the configuration shown in FIG. 3 with alternate tines 180° apart.

Shaft 24 is rotatably driven in any suitable manner and preferably by a motor and more particularly a hydraulic motor. In the preferred practice of the invention shaft 24 is formed by a pair of shaft segments or members each of which has a spline 28 for connection to a hydraulic motor 30. Motor 30 is thus center mounted with respect to both shaft members. The use of a center mounted hydraulic motor 30 avoids any side torque problems. The opposite end of each shaft member is mounted in a suitable bearing 32 to facilitate the rotation of shaft 24 and its tines 26.

As shown in FIG. 1 and 3 tubular braces 34 extend from top wall 20 and at the upper edge of side wall 22 for contact with the bed 12 to stabilize digger 10. A pair of wheels 36 is also provided to facilitate the transportation of digger 10 by tipping digger 10 on end and then rolling the digger.

FIGS. 2, 6, 7 and 13 illustrate the details of tines 26. As shown therein each tine includes a pair of outer members 38 permanently mounted to shaft 24 and spaced from each other so that an inner member 40 may be slidably mounted between outer members 38. Inner member 40 is locked in position by any suitable fastener such as by bolt 42 extending through selected holes 48. In this manner it is possible to adjust the effective length of each tine 26. Thus, as shown in FIG. 13 the tines may be adjusted so that the end of each tine is very near without contacting the base 44 of bed 12. The position of the shaft and length of the tines is also taken into account with respect to the distance of the shaft from the top wall 20 of shroud 18. Each tine preferably terminates in a ball or generally cylindrical extension 46 which performs the actual digging operation. The ball structure is preferred since it presents less wear and less tendency to damage any wall of bed 12 should there be any contact.

The inclusion of a separate detachable inner member 40 in tine 26 also has the advantage of being able to replace any worn parts, i.e. ball 46 or slidable member 40. In addition, the formation of the tine 26 of separate members permits the length adjustability previously described. FIG. 7, for example, illustrates a short length in solid and a longer length in phantom.

FIGS. 4, 5 and 12–13 illustrate the details of the direction guide mechanism for propelling digger 10 from one end of bed 12 to the other. As shown therein chain 16 is fixedly mounted at one end of bed 12 in any suitable manner, such as by having one of the ends secured to an S-hook or fastener 50. The other end of chain 16 is mounted to a winch 52 having a handle 54 for controlling the tension of chain 52. Thus, chain 16 could be mounted in a taut condition and held in that condition by locking winch 52 in any suitable manner.

Figure 5:
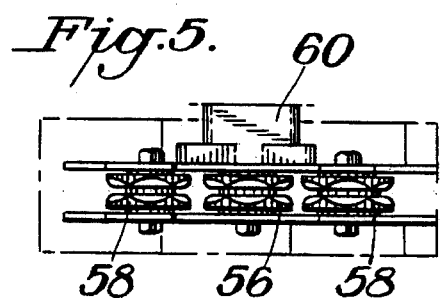
FIG. 5 is a cross-sectional view taken through FIG. 4 along the line 5—5.

As shown in FIGS. 4–5 and 13 and in particular FIG. 4 shroud 18 is provided with a plurality of sprockets. These sprockets include a central drive sprocket 56 and two idler sprockets 58. The teeth of the sprockets are engaged in the links of chain 16. Drive sprocket 56 is driven in any suitable manner and preferably by hydraulic motor 60. Hydraulic motor 60 is a reversible motor as is motor 30. The taut mounting of chain 16 cooperates in causing the tines 26 to dig into compost 14 under the influence of motor driven shaft 24 to move digger 10 in a downstream direction along chain 16. If necessary, it is possible to reverse the direction of movement of digger 10 by reversing the direction of motor 60. Similarly, if necessary the direction of shaft 24 could be reversed when, for example, a tine strikes a hard object such as a rock in bed 12 so that the digger 10 could be moved in a reverse direction until the impediment or rock is cleared.

A significant feature of the present invention is the ability for digger 10 to feed supplement into the worked compost while the digging action takes place and more particularly to discharge the supplement in the general area of the digging when shaft 24 is rotating tines 26. By directing the supplement toward the rotating tines, the supplement effectively penetrates into the worked compost.

The effectiveness of the application of the supplement is enhanced by the tine structure. This includes not only the ability to adjust the length of the tines but also the provision for digging close to the upstanding walls of bed 12. FIG. 2, for example, illustrates the inclusion of a pair of tines 26A which are mounted at an angle so that the tines penetrate the compost as close as practical to the side walls of bed 12.

Figure 9:
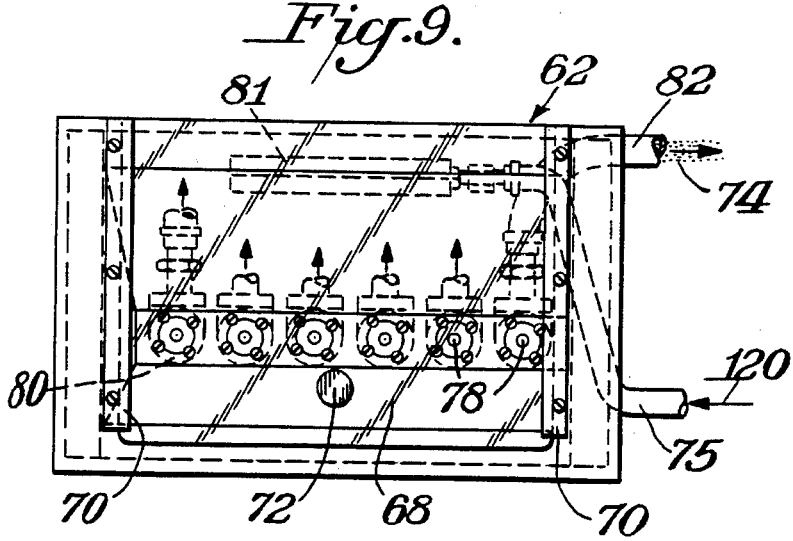
FIG. 9 is a top plan view of the supplement supply compartment used with the digger of this invention.
Figure 10:
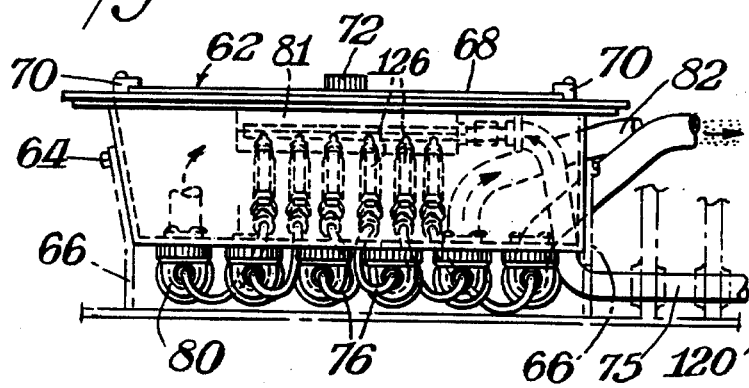
FIG. 10 is a front elevational view of the compartment shown in FIG. 9
Figure 11:
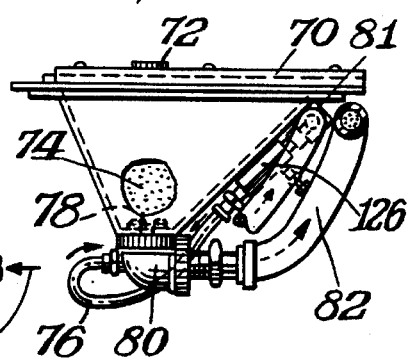
FIG. 11 is a right end elevational view of the compartment shown in FIGS. 9–10.

FIGS. 9–11 best illustrate the means for delivering the supplement from its storage compartment 62 for ultimate dispensing into the worked portion of the compost bed. As shown therein compartment 62 is detachably mounted to shroud 18 in any suitable manner such as by being fastened by bolts 64 to bracket 66 connected to shroud 18. The top wall 68 of compartment 62 functions as a removable cover. This removability feature is accomplished by providing compartment 62 with a pair of guide edges 70 under which cover 68 is slidably disposed. A handle 72 facilitates the manipulation of cover 68. The use of a sliding door is advantageous for space conservation considerations.

As shown for example in FIG. 11 the supplement 74 is in the form of a dry powder loosely placed in compartment 62. Air is utilized to dispense the supplement 74 from compartment 62. As shown in FIGS. 9–11 the air is fed through tubing 75 into a manifold 81 at the top of compartment 62. The manifold has a plurality of individual discharge hoses 76, each having a flow control valve 126. Six hoses 76 are shown. Each hose 76 leads to a head 80 at the bottom of compartment 62. The top of each head 80 includes a small openings 78 which functions as a venturi opening of smaller area than the path of flow of the air through head 80. As a result of the venturi effect the air draws the supplement 74 into heads 80 and then the supplement/air flow continues through the set of tubes 82 each of which is associated with one of the venturi openings. Thus, the flow of air laden with supplement is conveyed away from compartment 62 in individual streams.

The flow of supplement is dictated by the venturi opening. The flow of supplement 74 is controlled by the size of venturi opening 78. In the preferred practice of the invention a 7/16 inch washer is used as the outlet hole. As a result, it is possible to obtain maximum volume by using a suction force rather than gravity. The size and location of the venturi holes assure that there is no spillage of the powdered supplement 74 even when the compartment 62 is tilted.

Each tube 82 leads to a respective delivery head 84 mounted to shroud 18 as shown, for example, in FIG. 1. Each delivery head in turn communicates with the interior of shroud 18 through a series of discharge ports 86 as shown in FIG. 2. The amount of flow reaching delivery head 84 is controlled by adjustment of control valve 126 which may be a needle valve. Each needle valve may be adjusted so that the flow could range from a fully open condition to a fully closed condition. It is thereby possible by the adjustment of the control valve 126 to vary the amount of supplement being fed through different parts of the shroud. Thus, for example, a higher volume of supplement could be fed in the central area of shroud 18 and lower volumes in the outer areas as may be needed in certain applications.

Although six delivery heads are illustrated it is to be understood that the invention may be practiced with any suitable number of such delivery heads. As illustrated in FIG. 13 the provision of the discharge ports 86 is such as to directly supplement 74 into the areas of the compost where the tines 26 are performing the digging action.

FIG. 8 illustrates an alternate form of delivery head 84A which is fan shaped rather than being in the form of a loop. As shown in FIG. 8 each delivery head whether it be delivery head 84A or delivery head 84 is mounted between ribs 90 to protect the delivery heads.

Where loop shaped delivery heads are used the delivery heads, the head may be secured in any suitable manner. FIG.

1, for example, illustrates the provision of clamps 92 to secure each delivery head 84.

A further provision of this invention is the utilization of various controls to prevent damage to the components to digger 10. For example, FIG. 14 illustrates the provision of a sensor 94 for sensing the hydraulic and/or air pressures. Sensor 94 is associated with an air supply control 96 which would automatically shut off the flow of air if the pressure drops below a predetermined level. Pilot 94 and air supply control 96 are also illustrated in FIG. 1.

FIG. 14 illustrates the flow diagram for the air and hydraulic system used for digger 10. As shown therein a pump motor 98 is provided which pumps fluid from hydraulic fluid tank 100. Hydraulic fluid is then supplied into T-supply 102 where the flow is divided through lines 104, 106 and 108. The shut-off valve 110 permit the flows to be completely stopped. The flow through line 106 provides hydraulic fluid to motor 30. Hydraulic 60 is also supplied with hydraulic fluid. The control system includes a flow control valve 112 which may be of the ball type as well as a pressure gauge 114 and a cfm/pressure indicator 116. In addition an air control valve 118 communicates with air supply control 96. Air is fed through supply source 120.

The hydraulic return line communicates with tank 100 through cooler 122 and filter 124. With reference to FIG. 14 the flow of air passes through the shut off valve 118 and into manifold 81. The series of flow control or heads 80 is associated with manifold 81 through valves 126.

The flow control system illustrated in FIG. 14 also includes a flow control regulator where motor speed control 128 in a directional valve 130 for controlling the forward or reverse direction of motor 60.

As shown in FIG. 4 a protective cover is provided on shroud 18 to shield the various hydraulic lines.

The invention results in a more uniform temperature in addition to the more precise control in the amounts of supplement fed and in the areas in which the supplement is fed. The more uniform temperature results in cost savings as compared to conditions where the temperatures might be too high.

What is claimed is:

1. A digger for facilitating the application of supplement to a mushroom bed comprising a shroud having a top wall and side walls, a shaft mounted to said side walls, a plurality of digging tines extending generally radially outwardly from said shaft, a drive motor connected for rotating said shaft to cause said tines to dig into a mushroom bed when said digger is placed on the mushroom bed, a direction guide mechanism on said shroud for moving said digger along the mushroom bed as said tines are rotated and dig into the mushroom bed, a compartment mounted to said shroud for containing a supply of supplement, and supplement conveying means mounted to said shroud for joint longitudinal movement with said digging tines and said compartment for conveying the supplement from said compartment and directing the supplement toward the mushroom bed generally at the location of said tines digging into the mushroom bed simultaneously with the digging action of said tines.

2. The digger of claim 1 wherein said shaft comprises two shaft elements, and each of said shaft elements being mounted to said drive motor on a respective side of said drive motor to thereby mount said drive motor at the longitudinal center of said shaft.

3. The digger of claim 1 wherein each of said tines includes at least two members slidably mounted with respect to each other for adjusting the length of each of said tines.

4. The digger of claim 3 wherein each of said tines terminates in a ball member which functions as the digging element.

5. The digger of claim 4 wherein each of said tines is offset 90° with respect to its adjacent tine, alternate tines being disposed 180° apart from each other, said tines including an end tine mounted at each end of said shaft, and each of said end tines being angled outwardly from said shaft to facilitate the digging action at the sides of the mushroom bed.

6. A digger for facilitating the application of supplement to a mushroom bed comprising a shroud having a top wall and side walls, a shaft mounted to said side walls, a plurality of digging tines extending generally radially outwardly from said shaft, a drive motor connected for rotating said shaft to cause said tines to dig into a mushroom bed when said digger is placed on the mushroom bed, a direction guide mechanism on said shroud for moving said digger along the mushroom bed as said tines are rotated and dig into the mushroom bed, a compartment mounted to said shroud for containing a supply of supplement, supplement conveying means for conveying the supplement from said compartment and directing the supplement toward the mushroom bed at the location of said tines digging into the mushroom bed simultaneously with the digging action of said tines, and said supplement conveying means comprising air flow means for delivering the supplement in powder form in a flow of air to the mushroom bed.

7. The digger of claim 6 wherein said air flow means includes venturi opening means located in said compartment, and air flow tubes communicating with said venturi opening means to withdraw the supplement from said compartment by venturi action.

8. The digger of claim 7 wherein said supplement conveying means includes a plurality of separate delivery heads mounted to said shroud and each of said heads having discharge ports directed generally toward said tines.

9. The digger of claim 8 including volume control means for independently controlling the volume of supplement discharged through said delivery heads.

10. The digger of claim 9 wherein said compartment is detachably mounted to said shroud, and said compartment having a sliding door for having access to said shroud.

11. The digger of claim 10 wherein said shroud includes a plurality of outwardly extending reinforcing ribs, and each of said delivery heads being mounted between two of said reinforcing ribs whereby said reinforcing ribs provide protection for said delivery heads.

12. The digger of claim 10 wherein said shaft comprises two shaft members, and each of said shaft members being mounted to said drive motor on a respective side of said drive motor to thereby mount said drive motor at the longitudinal center of said shaft.

13. The digger of claim 12 wherein each of said tines includes at least two members slidably mounted with respect to each other for adjusting the length of each of said tines.

14. The digger of claim 13 wherein each of said tines terminates in a ball member which functions as the digging element.

15. The digger of claim 14 wherein each of said tines is offset 90° with respect to its adjacent tine, and alternate tines being disposed 180° apart from each other.

16. The digger of claim 15 wherein said tines include an end tine mounted at each end of said shaft, and each of said end tines being angled outwardly from said shaft to facilitate the digging action at the sides of the mushroom bed.

17. The digger of claim 16 wherein said shroud includes wheels mounted at the end of said top wall to facilitate the moveability of said shroud.

18. The digger of claim 17 wherein said direction guide mechanism includes a chain mounted longitudinally from one end of the mushroom bed to the other, a winch connected to said chain for controlling the tautness of said chain, a motor driven drive sprocket mounted to said shroud, an idler sprocket on each side of said drive sprocket, and said drive sprocket and said idler sprocket engaging said chain.

19. A method of applying a supplement to a mushroom bed comprising mounting a supply of supplement in powder form to a digger having a rotatable shaft with digging tines extending from the shaft, placing the digger over the mushroom beds, moving the digger along the bed while rotating the shaft and while having the rotating tines dig into the bed, directing the supplement toward the bed in the general area that the tines are digging into the bed simultaneously with the tines digging into the bed, conveying the supplement in individual streams of air, and controlling the volume of supplement conveyed in each stream independently of the other streams.

* * * * *